United States Patent Office 3,734,889
Patented May 22, 1973

3,734,889
QUATERNIZED OLIGOMERS BASED ON UREAS, GUANIDINE AND GUANYLUREA
Stanley A. Lipowski, Livingston, and John J. Miskel, Jr., Mendham, N.J., assignors to Diamond Shamrock Corporation, Cleveland, Ohio
No Drawing. Filed Aug. 25, 1971, Ser. No. 174,970
Int. Cl. C08g 22/02, 41/00; D21h 3/36
U.S. Cl. 260—77.5 C        10 Claims

ABSTRACT OF THE DISCLOSURE

A polyamine having only one primary amino group and only one tertiary amino group is condensed with a difunctional reactant to form a pre-condensate. This pre-condensate is then extended and quaternized by further reaction with a chain extender which is a dihalogenated hydrocarbon ether. Alternatively, a diamine having one primary amino group and one tertiary group is condensed with a difunctional reactant to form a pre-condensate which is then extended and quaternized by further reaction with a chain extender which is an epihalohydrin. The resulting products are useful as flocculents, as drainage aids, and as dry strength resins in paper manufacture.

BACKGROUND OF THE INVENTION

(1) Field of the invention

This invention relates to quaternary aminoplast polymers, their synthesis, and their uses as flocculents, as drainage aids, and as dry strength resins in paper manufacture.

(2) Description of the prior art

Numerous existing patents disclose a first reaction between polyamines and ureas, or carboxylic acids, or the like, followed by a second reaction with an epihalohydrin. The compositions produced by these reactions are frequently utilizable as wet strength resins in paper manufacture. Examples of such patents are United States patents: 2,926,116; 3,125,552; 3,240,664; 3,291,679; 3,520,774; 3,535,288; 3,556,932; and the United Kingdom Patent 1,129,065.

All of these patents, however, may be distinguished from the present invention in that (1) they have different utility, (2) they form totally different compositions in the first reaction due to critical differences in molar ratios of the components, and (3) there are critical differences in the particular components used in this invention and in the above patents.

SUMMARY OF THE INVENTION

The novel polymers of this invention are synthesized by first reacting from about 2 to about 3 moles of a polyamine having only one primary amino group and only one tertiary amino group with about 1 mole of a difunctional reactant so as to form a precondensate monomer. When reacted in these molar proportions, the pre-condensate will have a much lower molecular weight than if reacted in a ratio of less than 2:1. It is believed that this pre-condensate is a monomer because of its low molecular weight and since there is no viscosity increase upon prolonged heating of the condensate at elevated temperatures. If a high molecular weight pre-condensate is produced, a satisfactory product could not be obtained because the pre-condensate would tend to cross-link rather than extend. The pre-condensate reaction is considered completed when every primary amino group has condensed with one other primary amino group through a difunctional reactant bridge, and the completion may be ascertained therefore by the absence of any free primary amino groups. Where the difunctional reactant is a urea or a diamide, ammonia is given off during the condensation. Where the difunctional reactant is a carboxylic acid or anhydride, water is given off during the condensation. Where the difunctional reactant is a monoamide, both ammonia and water are given off during the condensation. The pre-condensate is then extended and quaternized by reacting about 1 mole of pre-condensate with about 1 mole of a chain extender which is a dihalogenated hydrocarbon ether. In conducting the reaction, the pre-condensate may be in the form of a 100% concentrate or may be diluted with water to at least a 1% solution. The rapidity of the reaction decreases as the dilution of the pre-condensate is increased. The reaction is carried out at about the reflux temperature of the mixture and continued until the alkali value drops to less than 1%. It is considered that this further reaction acts to form extended polymer chains but has little, if any, cross-linking effect. The polymer thus prepared is extremely stable and no further steps are required to maintain that stability. The presence of cross-linked polymers would yield an unstable composition having a tendency to gel upon storage.

An alternative polymer within the scope of this invention may be prepared by reacting a diamine having a primary amino group and a tertiary amino group with the same difunctional reactant stated above so as to form a pre-condensate and then extending and quaternizing this pre-condensate by further reaction with a chain extender which is an epihalohydrin or substituted epihalohydrin. The molecular ratios are the same as those stated above. In this alternative synthesis, it is necessary that the pre-condensate be in an aqueous solution, as addition hydrogen and hydroxyl groups are taken from the water and added to the molecule when the chain is extended. In this type of extension the epi linkage is broken and the carbon atom from which the oxygen has been severed, adheres to the tertiary nitrogen of one monomer, while the halogen linkage is also severed and the halogen is replaced by linkage of the carbon atom to which it was attached to the tertiary nitrogen of another monomer. The halogen then links to the tertiary nitrogen to which the carbon atom from which it was severed has linked. A hydrogen atom derived from the water is linked to the oxygen of the epi moiety, forming a hydroxyl group. A second hydroxyl group, derived from the water, is linked to that tertiary nitrogen to which the carbon atom from which the oxygen atoms has been severed is linked. This latter hydroxyl group accounts for the strong alkalinity of the polymer, as it forms a quaternary base.

DESCRIPTION OF THE PREFERRED EMBODIMENTS

The polyamines utilized in this invention must have only one primary amino group and only one tertiary amino group. The polyamines may have more than 2 amino groups, although diamines are preferred. The carbon chain backbone must be non-cyclic, may have between 1 and 18 carbon atoms, and may be branched or straight chain, saturated or unsaturated. Examples of useful polyamines include, but are not limited to:

methylethylaminolaurylamine,
dimethylaminopropylamine,
methyl bis (3-aminopropyl) amine,
methyl bis (3-aminoethyl) amine,
N-(2-aminoethyl) piperazine,
dimethyltriethylenetetramine,
diethylaminopropylamine,
aminodiethylaminostearyl alcohol,
N′bis (propylaminoethyl) butylenediamine,
bis (aminopropyl) propanediamine,
aminotripropylamine,
dimethylaminoallylamine, and diethanolaminododecylamine. A prefered polyamine is dimethylaminopropylamine.

The difunctional reactant utilized in this invention condenses with the polyamine to form a pre-condensate monomer, and must be either (A) urea, guanidine, guanylurea, alkyl substituted ureas having from one to 3 carbon atoms in the alkyl moiety, and mixtures thereof; or (B) non-cyclic dicarboxylic acids having a total of from 2 to 36 carbon atoms, which may be saturated or unsaturated, branched or straight chain, and substituted or unsubstituted, their monoamides, the diamides, their anhydrides and mixtures thereof. Thioureas and isothioureas are not utilizable in this invention (see Example X). Examples of dicarboxylic acids that may be used include, but are not limited to, oxalic, malonic, succinic, glutaric, adipic, pimelic, suberic, azealic, sebacic, fumaric, itaconic, citraconic, phthalic, terephthalic, maleic, brassic, brassylic, and roccellic acids and dimer acids. The preferred difunctional reactants are urea and adipic acid.

The chain extender must be a dihalogenated hydrocarbon ether whose carbon backbone may be straight or branched chain, saturated or unsaturated, and which if a monoether must have a total of from 2 to 12 carbon atoms and if a polyether must have a total of from 3 to 30 carbon atoms with from 2 to 6 ether linkages. Typical chain extenders include, but are not limited to: triglycoldichloride, dichloroethylether, difluoroisobutylether, dibromomethylether, diiodododecylpolyether, dichlorononylpolyether, difluorotetrabutyldecylpolyether, and the like, and mixtures thereof. A preferred chain extender is dichloroethylether.

Water may be used as a carrier for the pre-condensate during its chain extension by reaction with a dihalogenated hydrocarbon ether. The pre-condensate may be reacted either as a 100% concentrate or as an aqueous solution having as little as 1% solids. However, a 100% concentrate pre-condensate will usually result in an exothermic reaction which requires special precauations in production and therefore for practical purposes a 25-75% solution is preferred. A 1% solution will eventually fully react, but requires an unduly long time for completion of the reaction.

In the alternative synthesis, the polyamine must be a diamine having one primary amino group and one tertiary amino group. The carbon chain backbone must be non-cyclic, having between 1 and 18 carbon atoms and may be branched or straight chain, saturated or unsaturated. Examples of useful diamines include but are not limited to: methylethylaminolaurylamine, dimethylaminopropylamine, diethylaminobutylamine, aminodiethylaminostearyl alcohol, dimethylaminoallylamine, and diethanolaminododecylamine. A preferred diamine is dimethylaminopropylamine.

In the alternative synthesis, the same difunctional reactants may be utilized as are given above.

In the alternative synthesis, the chain extender is an epihalohydrin, an alkyl substituted epihalohydrin having from 1 to 3 carbon atoms in the alkyl moiety or mixtures thereof. Such chain extenders include, but are not limited to: epichlorohydrin, epibromohydrin, diethylepifluorohydrin, propylepichlorohydrin, methylepiiodohydrin, and the like. A preferred alternative synthesis chain extender is epichlorohydrin.

In the alternative synthesis, water must be present during the chain extension of the pre-condensate monomer. This water may be present as a diluent for the pre-condensate, in which case the pre-condensate should be a 25% to 75% aqueous solution. The necessity for the water is due to the linkage reaction of the epihalohydrin at which time a hydrogen moiety and a hydroxyl moiety are added to the molecule.

TABLE I.—APPROXIMATE REACTION PARAMETERS

| Component | | Mole ratio | | Time, hours | Temperature, °C. |
| --- | --- | --- | --- | --- | --- |
| | | Broad | Preferred | | |
| (A) | Difunctional reactant | 1.0 | 1.0 | 2-12 | 150-280 |
| | Polyamine | 2.0-3.0 | 2.0-2.3 | | |
| (B) | Pre-condensate (A) plus | 1.0 | 1.0 | 1-6 | 100-105 |
| | Chain extender | 1.0-1.5 | 1.0-1.2 | | |

It should be noted that the mole ratio in forming the pre-condensate is particularly critical. If less than 2.0 mole of polyamine are reacted with 1.0 mole of difunctional reactant, a cross-linked, high molecular weight pre-condensate will be produced. Such a pre-condensate would be entirely unsatisfactory for the purposes of this invention, which requires a low molecular weight pre-condensate monomer in which the chains can be extended, rather than a polymer in which they would be cross-linked.

The chemical structure of the polymers of this invention may be represented by the following general formula:

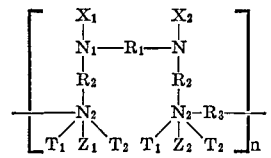

In the above formula:

$X_1$ and $X_2$ are hydrogen except where a substituted urea or diamide is used in which case $X_1$ and/or $X_2$ will be the substituent moiety or a part thereof.

$N_1$ is the primary amino group through which the polyamine is condensed to form the pre-condensate monomer.

$N_2$ is the tertiary amine through which the pre-condensate monomers are extended into long chain polymers.

$R_1$ is the condensing linkage and is the moiety remaining from the difunctional reactant after the ammonia and/or water is given off. For example, when urea is used, $R_1$ is CO, when adipic acid is used, $R_1$ is

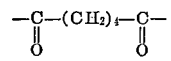

$R_2$ is the entire polyamino backbone between the primary and tertiary amino groups and remains unreacted. $R_2$ may contain secondary amino groups provided that a chain extender other than an epihalohydrin is used.

$R_3$ is the chain extending moiety. Where the chain extender is a dihalogenated hydrocarbon ether, $R_3$ is the moiety remaining after both halogens are removed, in which case the halogens are replaced by linkage with tertiary nitrogens of two different monomers. Where the chain extender is an epihalohydrin in the presence of water, $R_3$ is the moiety remaining after the halogen has been removed and the epoxy ring has been broken, with linkage of the carbon from which the oxygen linkage has been severed to the tertiary nitrogen of one monomer and conversion of the oxygen still adhering to the other carbon of the epi moiety to a hydroxyl group by the addition of hydrogen obtained from the water. The hydroxyl group remaining (from the water) is linked directly to the tertiary nitrogen at $Z_2$. The halogen is replaced by linkage to a tertiary nitrogen of a different monomer. Thus, where the chain extending moiety is a substituted epihalohydrin having the structural formula:

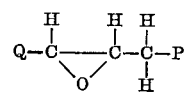

in which

P is a halogen, and

Q is a substituent moiety, then the extending linkage between two monomers ($R_3$) will have the structural formula:

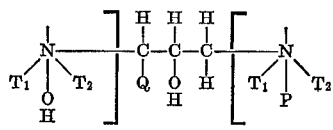

$T_1$ and $T_2$ are the moieties which were originally attached to the tertiary nitrogen, other than the backbone, and remain unchanged.

$Z_1$ and $Z_2$ are both halogens derived from the chain extender when it is a dihalogenated hydrocarbon ether. When the chain extender is an epihalohydrin in the presence of water, then $Z_1$ and $Z_2$ are respectively a halogen taken from the epihalohydrin and a hydroxyl group obtained from the water.

Thus, where the polyamine is dimethylaminopropylamine, the difunctional reactant is urea, and the chain extender is dichloroethylether, the structural formula of the polymer is:

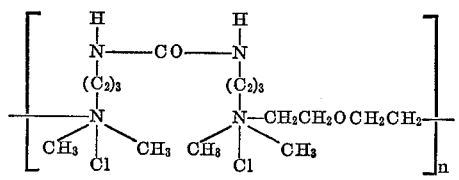

$n$ in all of the above formulas must be at least 5, and can range as high as 1,000.

The polymers of this invention are highly effective flocculents in processes where a flocculating amount of the composition is added to an aqueous system containing suspended solids. By flocculating amount is meant that quantity of the composition of the present invention which when added to a dispersion, suspension, or slurry, of suspended solids in an aqueous system is sufficient to flocculate or coagulate the suspended solids. The quantity of composition required to flocculate the suspended solids present in the aqueous system is determined in part by nature of the solids, particle size of the solids, impurities or contaminants present in the suspended solids, presence and nature of inert solids in the aqueous system, the quantity of solids present in the aqueous system, and other factors. From about 0.1 p.p.m. to about 5.0 p.p.m. of composition is usually adequate to flocculate, precipitate, or coagulate the suspended solids present in an aqueous system. The solids content of the aqueous system will vary from about 0.01% by weight to about 50% by weight of the total weight of the aqueous system.

To achieve optimum efficiency with the compositions of the present invention, the flocculent should be uniformly distributed throughout the aqueous system. Uniform distribution of the flocculent in the aqueous system is usually accomplished by use of as dilute a solution of the flocculent as practical without causing over dilution of the system being treated. However, the composition can be added in solid form or as a concentrated solution provided uniform distribution of the flocculent in the aqueous system is obtained. The composition is added to the aqueous system in a manner which assures uniform distribution. For example, a dilute solution of the composition can be added to the system and the resulting mixture vigorously agitated to obtain uniform distribution of the composition. The composition can also be added to the system while the system is being circulated during processing. After the composition has been uniformly mixed in the aqueous system, agglomeration or aggregation of suspended solids present in the system occurs. The resulting agglomerates or aggregates then separate from the aqueous phase and are removed by sedimentation, filtration, or the like.

The compositions of the present invention can be used in aqueous systems at any temperature above the freezing point of the liquid to any temperature up to the boiling point of the liquid. If desired, the compositions can be used at temperatures above the boiling point of the aqueous system provided that the process is carried out under sufficient pressure to maintain water present in the aqueous system in the liquid phase. The compositions are usually used in aqueous systems having temperatures of from about 45° F. to about 125° F.

The compositions can be used for flocculating and coagulating a large variety of suspended solid materials from aqueous systems such as dispersions, suspensions, slurries, and the like. They can be used as the only flocculent or may be ued in conjunction with conventional flocculents such as alums, aluminum sulfate, calcium chloride, lime, iron salts, glues, gelatins, starches, cellulose derivatives, and the like. The compositions can be used to clarify water for domestic and industrial purposes, especially as a flocculent in waste waters and as a drainage aid.

These compositions are also useful in the flocculation of solids such as organic polymeric materials suspended in aqueous systems. They can be used to flocculate natural rubber, synthetic rubber, other natural resins and polymers as well as other synthetic resins and polymers. These polymers are often employed in latex or emulsion forms in paper making, textile operations, and the like and large quantities of water are contaminated with the polymers. Such water must be clarified and purified by flocculation and/or coagulation of suspended polymers before the water can be discharged as effluent or reused. The compositions are also useful as flocculents to precipitate fillers and fines in save-alls and clarifiers in paper making. Such fillers and fines can be recovered from water used in paper making processes.

The compositions of the present invention are also useful as drainage aids. In drainage aids the object is to coagulate suspended solids into larger masses so that they attract a lesser volume of water. These large masses also more easily permit the free flow of water through sieves, meshes, etc., which would become clogged by the smaller particles of suspended solids.

The compositions of the present invention find other uses in paper making. They can be used in the production of paper such as bond paper, linear paperboard, bleached paperboard, off-set paper, Mimeograph paper, or the like. By the term "paper" is meant both paper and paperboard. These compositions are particularly useful as dry strength agents in paper making. From about 0.25 part by weight to about 10 parts by weight of the compositions dry are usually added to 2,000 parts by weight of paper pulp based on the dry fiber weight. The compositions are added to the pulp stock. The compositions can be added in concentrated or dry form, provided that they mix uniformly with the pulp in a relatively short time. When rapid mixing of the compositions with the pulp is desired, the compositions can be diluted to obtain solutions containing less than 5.0% solids. The compositions are usually added after refining and after alum addition in the paper making process. The compositions are useful in increasing the dry strength in both sulfite and kraft paper as well as paperboards.

EVALUATION OF THE COMPOSITIONS AS FLOCCULENTS AND DRAINAGE AIDS

The compositions were evaluated as flocculents in an aqueous system containing suspended solids. The aqueous system used for testing is adjusted until it contains 0.1% solids. In this evaluation, the system was 70% solids from black kraft liquor and 30% $TiO_2$. The pH was adjusted to 6.3. The system was stirred at 100 r.p.m. for 2 minutes. A 0.1% solution of the polymer being tested was added and the system stirred at 20 r.p.m. for 8 more minutes. After permitting the system to settle for 15 minutes, the supernatant clarity was determined using a turbidimeter which measured in Jackson Turbidity Units. Evaluations were made for additions of 0.25, 0.5, and 1.0 p.p.m. 6 cc. of a 0.1% solution of flocculent is equal to 1 p.p.m. in 600 cc. of aqueous system.

The compositions were evaluated as drainage aids in an aqueous system containing suspended solids. In the evaluation, a Schapper-Reigler freeness tester was used to test a black liquor furnish. The polymer evaluated was added as a 0.05% solution and was tested against the black liquor furnish without the polymer.

EVALUATION OF THE COMPOSITIONS AS DRY STRENGTH RESINS IN PAPER MANUFACTURE

The compositions can be evaluated in papermaking in the following manner. The compositions are used in the form of dilute solutions for purposes of convenience. The dilute solution of the composition is added to the paper pulp stock and the treated stock is used to prepare hand sheets. From about 0.25 part by weight to about 10 parts by weight of the composition dry is added to about 2,000 parts by weight of the pulp based on the dry fiber weight. The dry strength of the resulting hand sheet is then determined by the TAPPI Standard Procedure T403–ts 63—"Bursting Strength of Paper." Results obtained with hand sheets prepared from the treated pulp stock are then compared with the results obtained with hand sheets prepared from untreated pulp stock from the same pulp source.

EXAMPLE I

Preparation of an urea and a primary-tertiary amine pre-condensate 300 grams of urea (5 moles) and 1020 grams of dimethylaminopropylamine (10 moles) were mixed together in a reaction flask equipped with a stirrer, a condenser and a thermometer and attached to a second flask equipped with a dropping funnel. 600 grams of water and 10 drops of phenolphthalein indicator were added to the second flask and 980 grams of a 50% sulfuric acid were placed in the dropping funnel. The mixture in the first flask was heated slowly for 1 hour. At a temperature of about 118° C. ammonia gas started to escape vigorously and was being absorbed in the water. The sulfuric acid was added gradually to the absorption flask and the conversion rate in the reaction flask was followed by observing the color change of the indicator. After 45 minutes of reaction time a temperature of 126° C. was reached and the conversion was 33% completed. After 2 hours more the temperature rose to 147° C. and the conversion was 70% completed. At this point the reaction slowed down and more heat was applied to continue the condensation. After 1 hour and 15 minutes more (total reaction time being 5 hours) a temperature of 205° C. was reached. The reflux of the mixture practically stopped and the conversion was close to 100%. The condensate was cooled to 25° C. and 1150 grams were recovered as a light, yellow colored, syrupy liquid. 170 grams of the mixture escaped as ammonia (10 moles). The viscosity of the condensate was 270 centipoise as measured on a Brookfield viscometer, spindle No. 2 at 60 r.p.m. pH of the condensate was 11.4, and the pH of a 5% water solution was 10.8. The material analyzed for amine content showed the following values:

|  | Percent |
| --- | --- |
| Primary amine | 0 |
| Secondary amine | 0.5 |
| Tertiary amine | 48.5 |

This pre-condensate was within the scope of this invention.

EXAMPLE II

Preparation of a dicarboxylic acid and a primary-tertiary amine pre-condensate 146 grams of adipic acid (1 mole) were charged in a reaction flask equipped with a stirrer, a thermometer, a condenser and a Dean-Stark trap and 204 grams (2 moles) of dimethylaminopropylamine were added gradually, over a period of 20 minutes. The resulting exothermic reaction carried the temperature of the mixture to 120° C. The mass was stirred for 1½ hours, and then external heat was applied. After 2½ more hours the temperature rose to 160° C. and 60 grams of water-amine mixture were collected in the trap. 50 grams of dimethylaminopropylamine were added and after 3 more hours the temperature rose to 210° C. 26 grams of dimethylaminopropylamine were collected in the trap. The reaction mass was then cooled to room temperature and recovered as 316 grams of a light, yellow, syrupy liquid. This pre-condensate was within the scope of this invention.

EXAMPLE III

Preparation of a dicarboxylic acid and a primary-tertiary amine pre-condensate 188 grams of azelaic acid (1 mole) and 214 grams of dimethylaminopropylamine (2.1 mole) were mixed together in a reaction flask equipped similarly to Example II. The temperature of the mixture rose by itself to 130° C. The mixture was stirred at 130° C. for 1 hour and then external heat was applied. After 3½ more hours the temperature rose to 230° C. 75 grams of water-amine mixture were collected in the trap. The reaction mass was then cooled to room temperature and recovered as a light yellow, syrupy, liquid. This pre-condensate was within the scope of this invention.

EXAMPLE IV

Preparation of a guanidine, primary-tertiary amine, and dichloroethylether polymer 56 grams of guanidine (0.5 mole) and 102 grams of dimethylaminopropylamine (1.0 mole) were mixed together in the reaction flask used in Example I. When mixing, the temperature rose from 24° C. to 40° C. The mixture was heated to reflux and after 4 hours and 50 minutes, a maximum temperature of 215° C. was reached. The mixture was then cooled to 180° C. The trap was attached to the reaction mass and vacuum was applied. 9 grams of unreacted amine were removed. 50 cc. of cold water were added and the mixture cooled to room temperature. The resulting product was recovered as 164 grams of white syrup. 82 grams of the above product (0.25 mole) and 36 grams dichlorethylether (0.25 mole) were then mixed together and refluxed for 3 hours. The final temperature was 124° C. and the resulting product was a white syrup. This polymer was within the scope of this invention.

EXAMPLE V

Preparation of a polymer from the pre-condensate of Example I and dichlorethylether 1150 grams of the pre-condensate prepared according to Example I (5 moles) and 1000 grams water were mixed together and heated to a gentle reflux. 715 grams of dichlorethylether (5 moles) were added gradually over a period of ½ hour and the mixture was refluxed for 2 more hours. The final temperature was 110° C. The reaction mass was then cooled to room temperature (25° C.) and recovered as a light yellow, syrupy liquid having a viscosity of 2225 centipoise, as measured on Brookfield viscometer spindle No. 2 at 6 r.p.m. The pH of the 67% solids containing the product was 8.3. This polymer was within the scope of this invention.

EXAMPLE VI

Preparation of a polymer from the pre-condensate of Example I and methylene dibromide 46 grams (0.2 mole) of the pre-condensate prepared according to the process of Example I was heated to 90° C. and 36.5 grams (0.2 mole) of methylene dibromide was added slowly through a dropping funnel. After about 8 grams of the methylene dibromide was added a violently exothermic reaction raised the temperature to 150° C.

Ice water cooling was applied and the remainder of the methylene dibromide was added slowly while maintaining the temperature at 100° C. The heavy reaction mass was then dissolved in 80 grams of water and refluxed for 2 hours. After cooling to room temperature the product was recovered as a pale yellow liquid, containing about 50% solids, having a pH of 5.1 and a viscosity of 18 centipoise, as measured on a Brookfield viscometer, spindle No. 2 at 60 r.p.m. This polymer was not within the scope of this invention, as the low viscosity indicated a low molecular weight.

EXAMPLE VII

Preparation of a polymer solution from the precondensate of Example II and dichlorethylether 158 grams (0.5 mole) of the pre-condensate from Example II was added to 75 grams water and 71.5 grams (0.5 mole) of dichloroethylether. The mixture was heated to reflux and boiled for 2½ hours, the final temperature being 118° C. 157 grams of water was added and the cooled mixture was recovered as a yellow liquid containing about 50% solids. Viscosity was 127 centipoise, measured on a Brookfield viscometer, spindle No. 2 at 60 r.pm. The pH was 5.2. This polymer was within the scope of this invention.

EXAMPLE VIII

Preparation of a polymer solution from the pre-condensate of Example III and dichlorethylether 327 grams (1.0 mole) of the pre-condensate prepared according to Example III was diluted with water to a total weight of 600 g. 36 grams (0.25 mole) of dichlorethylether was added to 150 grams (0.25 mole) of the diluted pre-condensate and the mixture was refluxed for 4 hours. The cooled product was recovered as a yellow liquid containing about 60% solids, having a pH of 5.9 and a viscosity of 220 centipoise, as measured on a Brookfield viscometer, spindle No. 2 at 60 r.p.m. This polymer was

EXAMPLE IX

Preparation of a polymer solution from the pre-condensate of Example III and methylene dibromide 120 grams (0.2 mole) of the pre-condensate from Example III was added to 35 grams (0.2 mole) of methylene dibromide and the mixture was refluxed for 7 hours. After cooling the product was recovered as a yellow liquid, containing about 65% solids. The pH of the product was 5.8, and the viscosity was 32 centipoise as measured on a Brookfield viscometer, spindle No. 2 at 60 r.p.m. This polymer was not within the scope of this invention, as the low viscosity indicated a low molecular weight.

EXAMPLE X (A) Preparation of an urea and a primary-tertiary amine pre-condensate 30 parts by weight (2.2 mole) of dimethylaminopropylamine and 8 parts by weight (1.0 mole) of urea, technical crystals, were charged into a reaction vessel. The mixture was heated under a reflux condenser with agitation. The bulk of the reaction started at about 118° C. and as the reaction proceeded, the reflux temperature of the mixture rose gradually to about 175° C. The mixture was then heated for an additional 4 hours to ensure complete reaction. The excess amine was then stripped under vacuum. The result was a pre-condensate within the scope of this invention.

(B) Preparation of a polymer solution

The pre-condensate of part (A) was cooled to about 100° C. and mixed with 27 parts by weight of water, resulting in an aqueous solution. 19 parts by weight (0.13 mole) of dichloroethylether, technical grade, was then added in 10 equal portions, and the mixture was heated to reflux temperature after each addition. After completion of the addition, the mixture was refluxed for 2 more hours. The initial reflux temperature was about 100° C. and the final reflux temperature was about 112° C. The fully reacted polymer was then cooled to stop the reflux and 23 parts by weight of water was added. The resulting polymer was a yellow liquid having a viscosity before dilution of 225 centipoise measured on a Brookfield viscometer, spindle No. 2 at 30 r.p.m., 25° C. The pH of a 10% aqueous solution was 8.0±0.4. This polymer was within the scope of this invention.

EXAMPLE XI

Preparation of a thiourea and a primary-tertiary amine pre-condensate 76 grams of thiourea (1 mole) and 204 grams of dimethylaminopropylamine (2 moles) were heated together in a reaction flask. When the temperature rose above 100° C., the product discolored strongly and decomposition took place. This pre-condensate was not satisfactory and was outside the scope of this invention.

EXAMPLE XII

Preparation of a polymer solution from the condensate of Example II 31.6 grams (0.1 mole) of the condensate prepared according to Example II were mixed with 32.0 grams water. The pH of the mixture was 10.6, and the viscosity 10 centipoise. The mixture was transferred to a reaction flask and 9.2 grams (0.1 mole) of epichlorohydrin were added in one portion. The temperature rose from 24° C. to 50° C. The mixture was heated to reflux, boiled for 40 minutes and then cooled to room temperature. The resulting product was a lemon-yellow liquid containing 56% solids, having a pH of 12.0, and a viscosity of 50 centipoise. It was very stable on storage at high concentration and alkaline conditions. This polymer was within the scope of this invention.

EXAMPLE XIII

Preparation of a polymer solution from the condensate of Example I and epichlorohydrin 115 grams (0.5 mole) of the condensate prepared according to Example I were mixed with 115 grams water. The pH of the solution was 11.0, and the viscosity as measured on a Brookfield viscometer, spindle No. 2 at 60 r.p.m., was 30 centipoise. The mixture was transferred to the reaction flask and 46 grams of epichlorohydrin (0.5 mole) were added slowly over a period of 20 minutes. The temperature during the addition rose from 22° C. to 95° C. External heat was applied and the mixture was brought to its reflux temperature (105–106° C.) yielding a lemon-yellow colored solution which was then boiled for 15 minutes. The lemon-yellow colored solution turned red-brown. 46 grams of water were added and the solution was cooled to room temperature. The yield was 322 grams of a syrupy liquid having a pH of 13.2 and viscosity of 150 centipoise, as measured on a Brookfield viscometer, spindle 2 at 60 r.p.m. The solids content was 50%. This strongly alkaline material was shelf stable and did not show any changes on prolonged storage. This polymer was within the scope of this invention.

EXAMPLE XIV

Preparation of a polymer solution from the pre-condensate of Example I and methylene diiodide 46 grams (0.2 mole) of the condensate prepared according to Example I were heated to 95° C. and 54 grams of methylene diiodide (0.2 mole) were added slowly over a period of 15 minutes. The temperature of the mixture rose to 150° C. The mixture was allowed to cool to 130° C. and was agitated at this temperature for 45 minutes. 100 grams of water were added and the resulting solution was refluxed for 2 hours. After cooling to room temperature, the material was a dark yellow solution, containing 50% solids, having a pH of 5.5 and viscosity of 15 centipoise, Brookfield Spindle No. 2 at 60 r.p.m. This polymer was not satisfactory and was outside the scope of this invention.

EXAMPLE XV

Preparation of a polymer solution from malonamide, dimethylaminopropylamine and dichlorethylether 51 grams of malonamide (0.5 mole) and 102 grams of dimethylaminopropylamine (1.0 mole) were heated for 5 hours to a maximum temperature of 175° C. Copious fumes of ammonia gas escaped from the reaction mass during the temperature range of 130–175° C. The mixture was heated to a maximum temperature of 260° C. for 1 hour, and then cooled to 95° C. 72 grams of dichlorethylether were added slowly. When the temperature of the mixture reached 135° C. the reaction turned violently exothermic with a rapid rise in temperature. Water cooling was applied and the addition of the ether continued. A maximum temperature of 215° C. was reached at the end of addition. The mixture was then cooled to 100° C. and 100 grams of water and 10 more grams of dichlorethylether were added. The mixture was refluxed for 2 hours, temperature of the reflux being about 110° C. Then the excess unreacted ether (7 grams) was removed and the cooled reaction product adjusted with 23 grams of water to 58% solids. The recovered material was a dark orange colored syrupy liquid, having a pH of 8.0 and viscosity of 150 centipoise, Brookfield Spindle No. 2 at 60 r.p.m. This polymer was within the scope of this invention.

EXAMPLE XVI

Preparation of a dicarboxylic acid and a primary-tertiary amine pre-condensate 101 grams of sebacic acid (0.5 mole) and 123.6 grams of dimethylaminopropylamine (1.2 mole) were mixed together in a reaction flask equipped with a condenser and a water trap. On mixing the temperature rose from 24° C. to 80° C. External heat was applied. At 147° C. the distillation started and after 3 hours a temperature of 230° C. was reached and 64 grams of amine and water mixture were collected in the trap. The reaction mixture in the flask was cooled to 120° C. and 80 grams of dimethylaminopropylamine were added. After 2 more hours reaction time at a temperature reaching a maximum of 250° C., the mixture was cooled to 190° C. and a vacuum was applied. 55 grams more of amine and water were collected in the trap. The reaction product was cooled to 100° C., diluted with 174 grams water, and further cooled to room temperature. The recovered material (360 grams) was a yellow-green colored liquid containing 50% solids, having a pH of 10.7.

EXAMPLE XVII

Preparation of a polymer solution from the pre-condensate of Example XVI and dichlorethylether 180 grams of the condensate solution (0.25 mole), prepared according to Example XVI and 36 grams of dichlorethylether (0.25 mole) were mixed together and refluxed for 3 hours. The initial reflux temperature of 100° C. rose to 104.5° C. After cooling to 25° C. the resulting product was a light brown colored syrupy liquid having 65% solids, a pH of 8.0 and a viscosity of 530 centipoise, Brookfield Spindle No. 2 at 30 r.p.m. This polymer was within the scope of this invention.

EXAMPLE XVIII

Preparation of a polymer solution from the pre-condensate of Example XVI and methylene dibromide 180 grams (0.25 mole) of the condensate solution from Example XVI and 44 grams of methylene dibromide (0.25 mole) were refluxed for 3 hours. The starting reflux temperature of 99° C. rose to 101° C. After cooling to 25° C. the resulting material was a light brown colored liquid having 66% solids, a pH of 7.4 and a viscosity of 30 centipoise, Brookfield Spindle No. 2 at 60 r.p.m. This polymer was unsatisfactory and was not within the scope of this invention.

TABLE II.—STABILITY OF POLYMERS PREPARED ACCORDING TO EXAMPLE V

| Sample | | Date differential, months | Viscosity (Brookfield viscometer) |
|---|---|---|---|
| I | 49% solids | 0 | 140 cp. (spindle 2 at 30 r.p.m.). |
|   |            | 5 | 160 cp. (spindle 2 at 30 r.p.m.). |
| II | 67% solids | 0 | 350 cp. (spindle 2 at 60 r.p.m.). |
|    |            | 19 | 360 cp. (spindle 2 at 60 r.p.m.). |

It should be noted that the two tests of Sample I, which showed a 14.3% increase in viscosity after five months, were taken on different viscometers. The two tests of Sample II, which showed a 2.9% increase in viscosity after 19 months were taken on the same viscometer. An increase in viscosity may be considered to be a sign of instability for the polymers of this invention. Since the viscosity increase of Sample II is within the expected deviation for a Brookfield viscometer, it may be considered to show that this polymer remained substantially stable for a period of 19 months. The differential in Sample I may have been caused by testing with different viscometers. However, even an increase of 14.3% after 5 months indicates that the polymer is more stable than those of the prior art. Furthermore, this stability was achieved without the necessity of the acid addition stabilization step required in most of the prior art.

TABLE III

Flocculent evaluation

The polymers of Examples V, VI through IX, XIV, XV, XVII, and XVIII were evaluated as flocculents in accordance with the previous description. The results were as follows:

| Polymer of Example— | Jackson turbidity units (J.T.U.) at— | | |
|---|---|---|---|
|   | 0.25 p.p.m. | 0.5 p.p.m. | 1.0 p.p.m |
| Blank |  | 1,000+ | 1,000+ |
| B | 150 | 350 | 500 |
| VI |  | 1,000+ | 1,000+ |
| VII |  | 150 | 150 |
| VIII |  | 425 | 275 |
| IX |  | 1,000+ | 1,000+ |
| XIV |  | 1,000+ | 1,000+ |
| XV |  | 230 | 190 |
| XVII |  | 260 | 185 |
| XVIII |  | 1,000+ | 1,000+ |

It is considered that any polymer that has a J.T.U. value of over 600 is inadequate as a flocculent.

TABLE IV

Drainage aid evaluation

The polymer of Example V was evaluated as a drainage aid in accordance with the previous description. The results indicated that the rate of drainage of water from a solids suspension was increased by 14.2 percent upon addition of this polymer, when compared to the rate of drainage without any additive.

TABLE V
Dry strength resin evaluation

The polymers of Examples V and VII were evaluated as dry strength resins in accordance with the previous description. The results were as follows:

| | .5% of polymer added | | 1.0% of polymer added | |
|---|---|---|---|---|
| Polymer of Example— | Actual dry strength (lbs./sq. in.) | Percentage increase | Actual dry strength (lbs./sq. in.) | Percentage increase |
| Blank | 22.0 | | 22.0 | |
| V | 25.7 | 11.7 | 29.8 | 35.0 |
| VII | 24.4 | 11.1 | 29.0 | 31.0 |

What we claim is:

1. An aminoplast polymer comprising the reaction product of:
   (I) about 1.0 mole of a pre-condensate comprising the reaction product of
      (A) from about 2.0 to about 3.0 mole of a polyamine having only one primary amino group and only one tertiary amino group, said polyamine having a non-cyclic backbone containing between 1 and 18 carbon atoms, with
      (B) about 1.0 mole of a difunctional reactant selected from the group consisting of
         (1) at least one of the group consisting of urea, guanidine, guanylurea, and alkyl substituted ureas having from 1 to 3 carbon atoms in the alkyl moiety, and
         (2) at least one of the group consisting of non-cyclic dicarboxylic acids having a total of from 2 to 36 carbon atoms, their monoamides, their diamides, and their anhydrides, with
   (II) from about 1.0 to about 1.5 mole of a chain extender which is a non-cyclic dihalogenated hydrocarbon ether selected from at least one of the group consisting of monoethers having a total of from 2 to 12 carbon atoms and polyethers having a total of from 3 to 30 carbon atoms and from 2 to 6 ether linkages.

2. The composition of claim 1 in which the polyamine is dimethylaminopropylamine.

3. The composition of claim 1 in which the difunctional reactant is urea.

4. The composition of claim 1 in which the difunctional reactant is adipic acid.

5. The composition of claim 1 in which the chain extender is dichloroethylether.

6. An aminoplast polymer comprising the reaction product of:
   (I) about 1.0 mole of a pre-condensate comprising the reaction product of
      (A) from about 2.0 to about 3.0 mole of a diamine having only one primary amino group and only one tertiary amino group, said diamine having a non-cyclic backbone containing between 1 and 18 carbon atoms, with
      (B) about 1.0 mole of a difunctional reactant selected from the group consisting of
         (1) at least one of the group consisting of urea, guanidine, guanylurea, and alkyl substituted areas having from 1 to 5 carbon atoms in the alkyl moiety, and
         (2) at least one of the group consisting of non-cyclic dicarboxylic acids having a total of from 2 to 36 carbon atoms, their monoamides, their diamides, and their anhydrides, with
   (II) from about 1.0 to about 1.5 mole of a chain extender which is selected from at least one of the group consisting of epihalohydrins and alkyl substituted epihalohydrins containing from 1 to 3 carbon atoms in the alkyl moiety and about 1.0–1.5 more water.

7. The composition of claim 6 in which the polyamine is dimethylaminopropylamine.

8. The composition of claim 6 in which the difunctional reactant is urea.

9. The composition of claim 6 in which the difunctional reactant is adipic acid.

10. The composition of claim 6 in which the chain extender is epichlorohydrin.

References Cited
UNITED STATES PATENTS

| | | | |
|---|---|---|---|
| 2,810,713 | 10/1957 | Melamed | 260—80.3 |
| 2,816,879 | 12/1957 | Wittbecker | 260—77.5 |
| 3,044,989 | 7/1962 | Shivers | 260—77.5 |
| 3,119,793 | 1/1964 | Inaba et al. | 260—77.5 |
| 3,399,110 | 8/1968 | Sommer et al. | 162—190 |
| 3,551,288 | 12/1970 | Ziemann et al. | 162—164 |
| 3,658,641 | 4/1972 | Shen | 162—164 |

FOREIGN PATENTS

| | | | |
|---|---|---|---|
| 451,795 | 10/1948 | Canada | 260—77.5 |
| 745,423 | 3/1944 | Germany | 260—77.5 |
| 886,430 | 10/1943 | France | 260—77.5 |
| 915,504 | 1/1963 | Great Britain | 260—77.5 |

OTHER REFERENCES

D.A.S. 1, 118, 457, November 1961, Rohm & Haas, pp. 1–4.

DONALD E. CZAJA, Primary Examiner

H. S. COCKERAM, Assistant Examiner

U.S. Cl. X.R.

162—164; 260—77.5 R, 77.5 Q

UNITED STATES PATENT AND TRADEMARK OFFICE
CERTIFICATE OF CORRECTION

PATENT NO. : 3,734,889
DATED : May 22, 1973
INVENTOR(S) : Stanley A. Lipowski and John J. Miskel, Jr.

It is certified that error appears in the above-identified patent and that said Letters Patent are hereby corrected as shown below:

Column 2, line 1, "Whene" should be --Where--; Column 2, line 32, "addition" should be --additional--; Column 2, line 47, "atoms" should be --atom--. Column 3, line 11, "the" should be --their--; Column 3, line 40, "precauations" should be --precautions--. Column 4, Table I, under heading "Temperature, °C.", "105" should be --150--; Column 4, line 25, in the formula, "$N_1$—$R_1$—N" should be --$N_1$—$R_1$—$N_1$--. Column 5, line 24, in the formula "$(C_2)_3$" (both occurrences) should be --$(CH_2)_3$--. Column 9, line 39, add --within the scope of this invention--. Column 10, line 23, after "Example 11" add --and epichlorohydrin--. Column 12, Table III, line 52, "llank" should be --Blank--; Column 12, Table III, line 53, "B" should be --V--; Column 12, Table III, line 56, "VX" should be --IX--. Column 13, line 51, in claim 5, "5" (second occurrence) should be deleted. Column 14, line 9, "areas" should be --ureas--; Column 14, line 9, "5" should be --3--; Column 14, line 20, "more" should be --mole--.

Signed and Sealed this

Eleventh Day of January 1977

[SEAL]

Attest:

RUTH C. MASON
Attesting Officer

C. MARSHALL DANN
Commissioner of Patents and Trademarks